United States Patent
Kobayashi et al.

(10) Patent No.: US 8,627,318 B2
(45) Date of Patent: Jan. 7, 2014

(54) IMAGE FORMING APPARATUS, METHOD OF ACQUIRING IDENTIFICATION INFORMATION, AND NON-TRANSITORY COMPUTER READABLE MEDIUM

(75) Inventors: Kunihiko Kobayashi, Kanagawa (JP); Yoshiaki Tezuka, Kanagawa (JP); Tomomichi Adegawa, Kanagawa (JP); Tsuyoshi Watanabe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 183 days.

(21) Appl. No.: 12/939,720

(22) Filed: Nov. 4, 2010

(65) Prior Publication Data
US 2011/0283282 A1 Nov. 17, 2011

(30) Foreign Application Priority Data
May 17, 2010 (JP) ................................ 2010-113538

(51) Int. Cl.
*G06F 9/46* (2006.01)
(52) U.S. Cl.
USPC .......................................... 718/100; 358/1.15
(58) Field of Classification Search
None
See application file for complete search history.

(56) References Cited

U.S. PATENT DOCUMENTS

| | | | | |
|---|---|---|---|---|
| 4,530,051 A | * | 7/1985 | Johnson et al. | 709/203 |
| 5,809,522 A | * | 9/1998 | Novak et al. | 711/118 |
| 8,146,105 B2 | * | 3/2012 | Nakamura | 719/318 |
| 2004/0168157 A1 | * | 8/2004 | Hundt et al. | 717/130 |
| 2008/0077919 A1 | | 3/2008 | Shida et al. | |
| 2008/0123686 A1 | * | 5/2008 | Lee et al. | 370/466 |
| 2009/0009803 A1 | * | 1/2009 | Takeuchi et al. | 358/1.15 |
| 2009/0244620 A1 | * | 10/2009 | Takahashi et al. | 358/1.15 |
| 2010/0002254 A1 | * | 1/2010 | Hyo | 358/1.15 |
| 2012/0120452 A1 | * | 5/2012 | Utsunomiya et al. | 358/1.15 |

FOREIGN PATENT DOCUMENTS

JP 2008-77186 A 4/2008

* cited by examiner

*Primary Examiner* — Emerson Puente
*Assistant Examiner* — Mehran Kamran
(74) *Attorney, Agent, or Firm* — Sughrue Mion, PLLC

(57) ABSTRACT

An image forming apparatus includes: a first processing section that, in an environment where a first operating system is running, executes a process for a first application program, and performs a generation process for generating identification information for identifying the process for the first application program; and a second processing section that, in an environment where a second operating system is running, executes a process for a second application program, and when the process for the second application program is instructed to be executed, performs an identification information acquisition process for acquiring identification information newly generated through the generation process of the first processing section as identification information for identifying the process for the second application program.

12 Claims, 9 Drawing Sheets

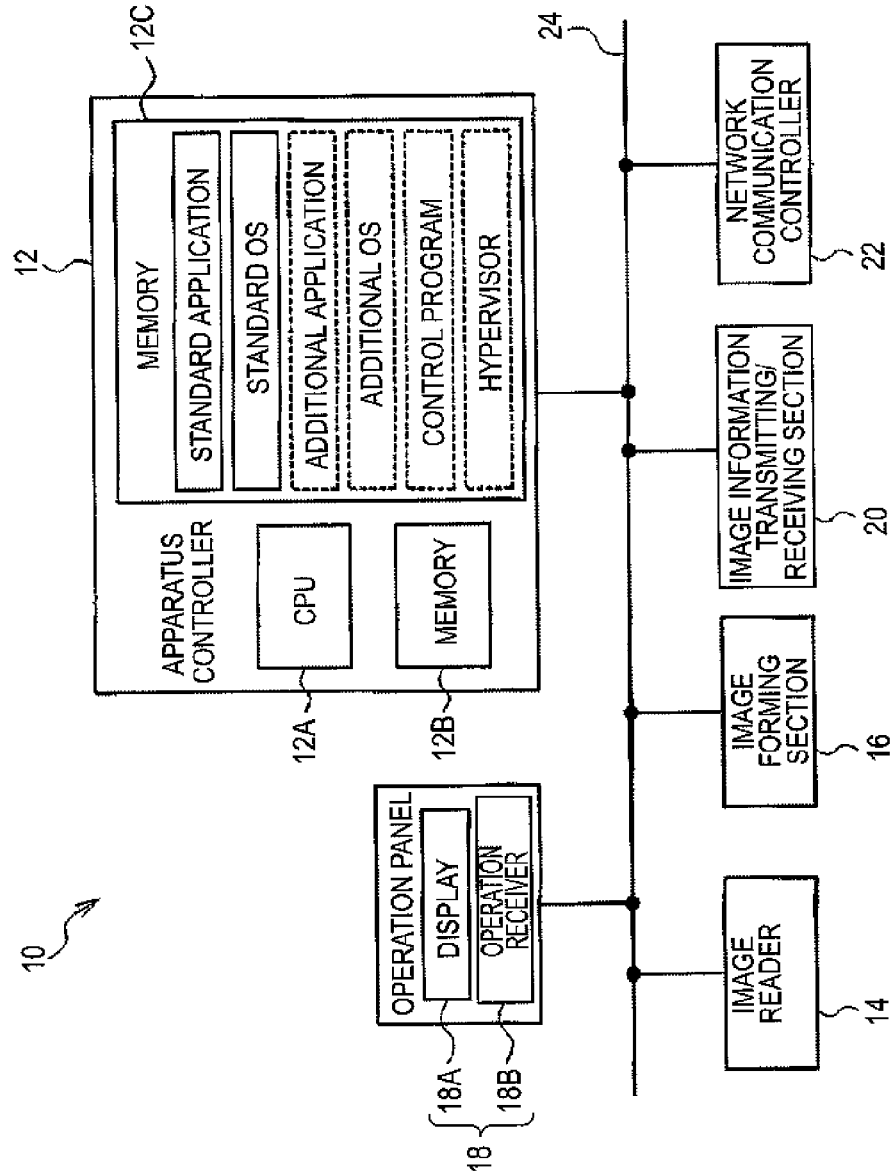

SOFTWARE CONFIGURATION WHEN NO ADDITIONAL APPLICATION IS PROVIDED

SOFTWARE CONFIGURATION WHEN ADDITIONAL APPLICATION IS PROVIDED

IMAGE FORMING APPARATUS, METHOD OF ACQUIRING IDENTIFICATION INFORMATION, AND NON-TRANSITORY COMPUTER READABLE MEDIUM

CROSS-REFERENCE TO RELATED APPLICATION

This application is based on and claims priority under 35 U.S.C. §119 from Japanese Patent Application No. 2010-113538 filed on May 17, 2010.

BACKGROUND

Technical Field

The present invention relates to an image forming apparatus, a method of acquiring identification information and a non-transitory computer readable medium storing the same.

SUMMARY

According to an aspect of the invention, there is provided an image forming apparatus including:

a first processing section that, in an environment where a first operating system is running, executes a process for a first application program, and performs a generation process for generating identification information for identifying the process for the first application program; and a second processing section that, in an environment where a second operating system is running, executes a process for a second application program, and when the process for the second application program is instructed to be executed, performs an identification information acquisition process for acquiring identification information newly generated through the generation process of the first processing section as identification information for identifying the process for the second application program.

BRIEF DESCRIPTION OF THE DRAWINGS

Exemplary embodiments of the present invention will be described in detail based on the following figures, wherein:

FIG. 1 is a schematic block diagram showing an example of the configuration of an image forming apparatus;

DETAILED DESCRIPTION

Figure 2A:
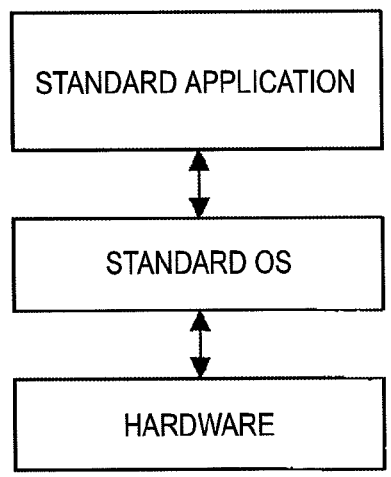
FIG. 2A is a conceptual diagram showing the relationship between programs when no additional application is provided.

Hereinafter, an exemplary embodiment of the invention will be described in detail with reference to the drawings.

FIG. 1 shows an image forming apparatus 10 according to this exemplary embodiment. The image forming apparatus 10 is at least provided with an apparatus controller 12 which controls the workings of respective sections of the image forming apparatus 10, an image reader 14 which optically reads a set document (paper document) to be read and outputs read image data, an image forming section 16 which forms an image represented by input image data on a recording sheet, an operation panel 18 which is provided with a display 18A including an LCD or the like and an operation receiver 18B including a numeric key, a touch panel, or the like and receiving an operation from a user, an image information transmitting/receiving section 20 which performs transmission/reception (facsimile communication) of image information with respect to another apparatus with a function as a facsimile machine through a telephone line and a public communication network (not shown), and a network communication controller 22 which performs transmission/reception of information with respect to a terminal apparatus 70 or a job management server 50, such as a PC (Personal Computer), through a network cable and a computer network 80 (also see FIG. 3). These sections are connected to each other through a bus 24.

The apparatus controller 12 is constituted by a microcomputer or the like, and is provided with a CPU 12A, a memory 12B, and a nonvolatile memory 12C which is constituted by an HDD (Hard Disk Drive), a flash memory, or the like. The memory 12C at least stores a program of a standard application which performs a process for providing the standard functions (for example, a copy function, a function of performing facsimile transmission/reception, and the like) of the image forming apparatus 10 to the user of the image forming apparatus 10, and sends a control command and performs input/output control for controlling the working of an input/output device, such as the image reader 14 or the image forming section 16 so as to perform screen control for causing the display 18A to display a screen for providing the standard functions, and a program of a standard operating system (standard OS) which functions as a platform for executing the program of the standard application.

The image forming apparatus 10 according to this exemplary embodiment additionally stores a program of an additional application or the like in the memory 12C of the apparatus controller 12 for the user of the image forming apparatus 10 to newly add a function. In FIG. 1, a program for providing an additional function is indicated by a broken line. The memory 12C of the apparatus controller 12 additionally stores a program of an additional application which performs a process for providing an additional function and screen control to cause the display 18A to display a screen for providing the additional function or a menu screen, a program of an additional operating system (additional OS) which functions as a platform for executing the program of the additional application, a control program for performing a process to be realized by the standard application and a process, such as distribution of a process to be realized by the additional application, and a program of a hypervisor which provides functions, such as virtualization of the hardware resource, adjustment of a shared resource between the standard OS and the additional OS, and communication between the standard OS and the additional OS.

When an additional program group (the program of the additional OS, the program of the additional application, the control program, and the program of the hypervisor) is not additionally stored in the memory 12C of the apparatus controller 12, in a state where the image forming apparatus 10 is working, the CPU 12A executes the program of the standard OS as well as the program of the standard application in an environment where the standard OS is running (also see FIG. 2A). In this case, in the image forming apparatus 10, the menu screen on which the available standard functions are listed and displayed as options is displayed on the display 18A. When any standard function displayed on the menu screen as an option is selected by the user, an operation screen for designating the content of a process for providing the selected standard function is displayed on the display 18A. When process execution is instructed after the process content has been designated by the user through the operation screen, a process is performed for controlling the working of a corresponding H/W module (at least one of the image reader 14, the image forming section 16, and the image information transmitting/receiving section 20) such that the process corresponding to the designated process content is performed.

Figure 2B:
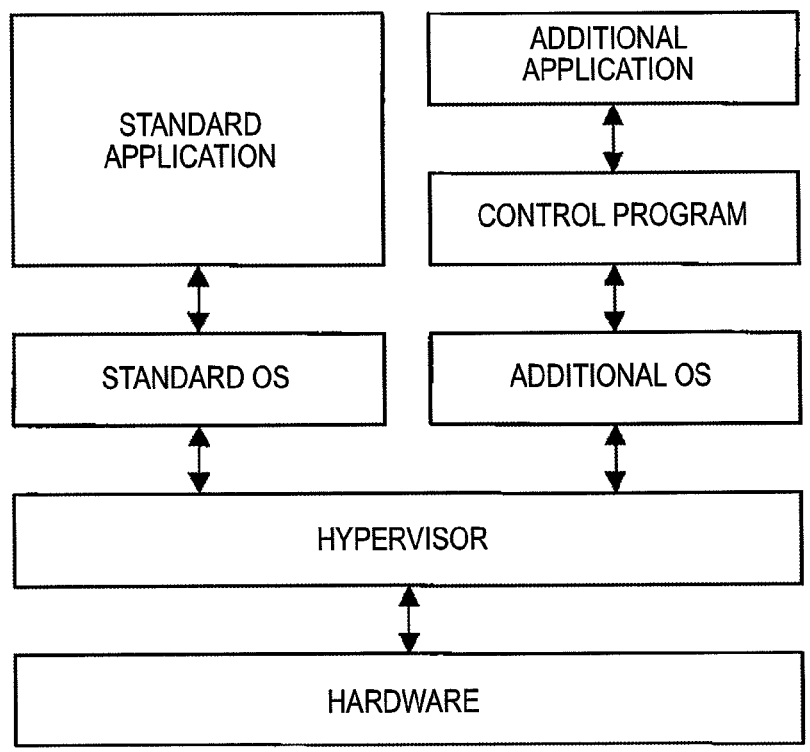
FIG. 2B is a conceptual diagram showing the relationship between programs when an additional application is provided.

Meanwhile, when the above-described additional program group is additionally stored in the memory 12C of the apparatus controller 12, the standard application and the standard OS, the additional application, the additional OS and the control program are assigned to different logical partitions (virtual environment). For example, as shown in FIG. 2B, while the image forming apparatus 10 is working, there are provided in parallel a system (standard system) which is realized by the standard application running on the standard OS and a system (additional system) which is realized by the additional application and the control program running on the additional OS. Provision of the standard functions to the user is realized by the cooperation of both systems, and the process for providing the standard functions is performed by the standard system. When additional functions are provided to the user, a process for providing the additional functions is performed by the additional system.

Specifically, in the image forming apparatus 10 being worked, the CPU 12A (apparatus controller 12) which executes the program of the additional application performs screen control to cause the display 18A to display the menu screen on which all functions (standard functions and additional functions) to be provided to the user are listed and displayed as options. When anyone function displayed on the menu screen as an option is selected by the user, the control program which is executed by the CPU 12A determines whether the selected function is the standard function to be provided by the standard application or the additional function to be provided by the additional application. When the selected function is the standard function to be provided by the standard application, a process is performed for notifying the standard application that the relevant standard function is selected. Thus, when the CPU 12A (apparatus controller 12) which executes the program of the standard application causes an operation screen corresponding to the selected standard function to display, and the user designates a process content through the operation screen and instructs execution of a process, a process is performed for controlling the working of a corresponding H/W module through the hypervisor such that the process corresponding to the designated process content is performed.

Meanwhile, when the additional function to be provided by the additional application among the functions displayed on the menu screen as options is selected by the user, the CPU 12A (apparatus controller 12) which executes the program of the additional application causes the display 18A to display an operation screen for designating the content of a process for providing the selected additional function, and the user designates the process content through the operation screen and then instructs execution of the process, a process is performed for controlling the working of a corresponding H/W module through the hypervisor such that the process corresponding to the designated process content is performed.

The standard application or the additional application may include the following function: a function which is selected through the menu screen and runs with a process content designated; and a function, such as a print process for printing electronic data, which runs in response to an instruction (the detailed process content has already been designated by the terminal apparatus 70) to execute a job (which will be described below) received from the terminal apparatus 70 or the like, which is connected to a network, through the computer network 80. Even when the execution instruction is received in such a manner, the control program which is executed by the CPU 12A determines whether the function corresponding to the relevant execution instruction is the standard function to be provided by the standard application or the additional function to be provided by the additional application, and then the relevant function is executed in the same manner as described above.

In this exemplary embodiment, the process unit of each function to be executed by the image forming apparatus 10 is called a job. In this exemplary embodiment, an execution instruction is issued to the image forming apparatus 10 for each job to execute each job by the image forming apparatus 10. The execution instruction is issued when the user instructs through the menu screen displayed on the display 18A, or when the image forming apparatus 10 receives an execution instruction transmitted from the terminal apparatus 70 to the image forming apparatus 10 by the user, and received by the apparatus controller 12 of the image forming apparatus 10. The job information of the execution-instructed job is transmitted to the job management server 50.

The job information is information regarding the execution-instructed job, and includes a job ID which is identification information for identifying each job and information which represents the processing result of the job. The job information may include the content of the job, identification information of the user who makes the job execution instruction, and the like. The job information is temporarily stored in the predefined memory areas (job information memory areas) of the memory 12B corresponding to the standard system and the additional system. When the job ends, job information including the temporarily stored job ID and the processing result is transmitted to the job management server 50.

In this exemplary embodiment, the process which is provided as the standard function in accordance with the execution of the program of the standard application includes a copy process for reading an image of an original document and printing the read image (image forming) and a facsimile communication process. It is assumed that the program of the standard application includes the above-described program for screen control, a program for a job ID creation process in which, for an execution-instructed job, identification information (job ID) for identifying the relevant job is created, a program for input/output control in which a control command is sent at the time of the working of the image reader 14 or the image forming section 16, and a program for a job information transmission process in which job information is transmitted to the job management server 50.

The process provided as the additional function in accordance with the execution of the program of the additional application includes a print process for performing print on the basis of print information and a scan process for reading an image of an original and saving (or transmitting) read image data. It is assumed that the program of the additional application includes the above-described program for screen control, and a program for a job information transmission process in which job information is transmitted to the job management server 50.

The control program includes a program for a job ID acquisition process for acquiring a job ID described below. The apparatus controller 12 functions as an example of an identification information acquisition section of the invention when the CPU 12A executes the control program.

When the additional system executes the function of the print process, it is necessary to work the image forming section 16. Meanwhile, since the working of the image forming section 16 or the like is controlled by the standard system (the above-described input/output control), the additional system works the image forming section 16 through the standard system. Similarly, when the additional system executes the function of the scan process, the additional system works the image reader 15 through the standard system. That is, the additional system handles the standard system as a simple input/output device in a pseudo manner. Meanwhile, the copy process or the facsimile process is the function which is executed by the standard system without passing through the additional system. However, as described above, when the additional system is added, screen control is performed by using the program for screen control on the additional system. Thus, the standard system sequentially notifies the processing end result or information representing the state during processing to the additional system so as to display thereof on the display 18A of the operation panel 18.

Figure 3:
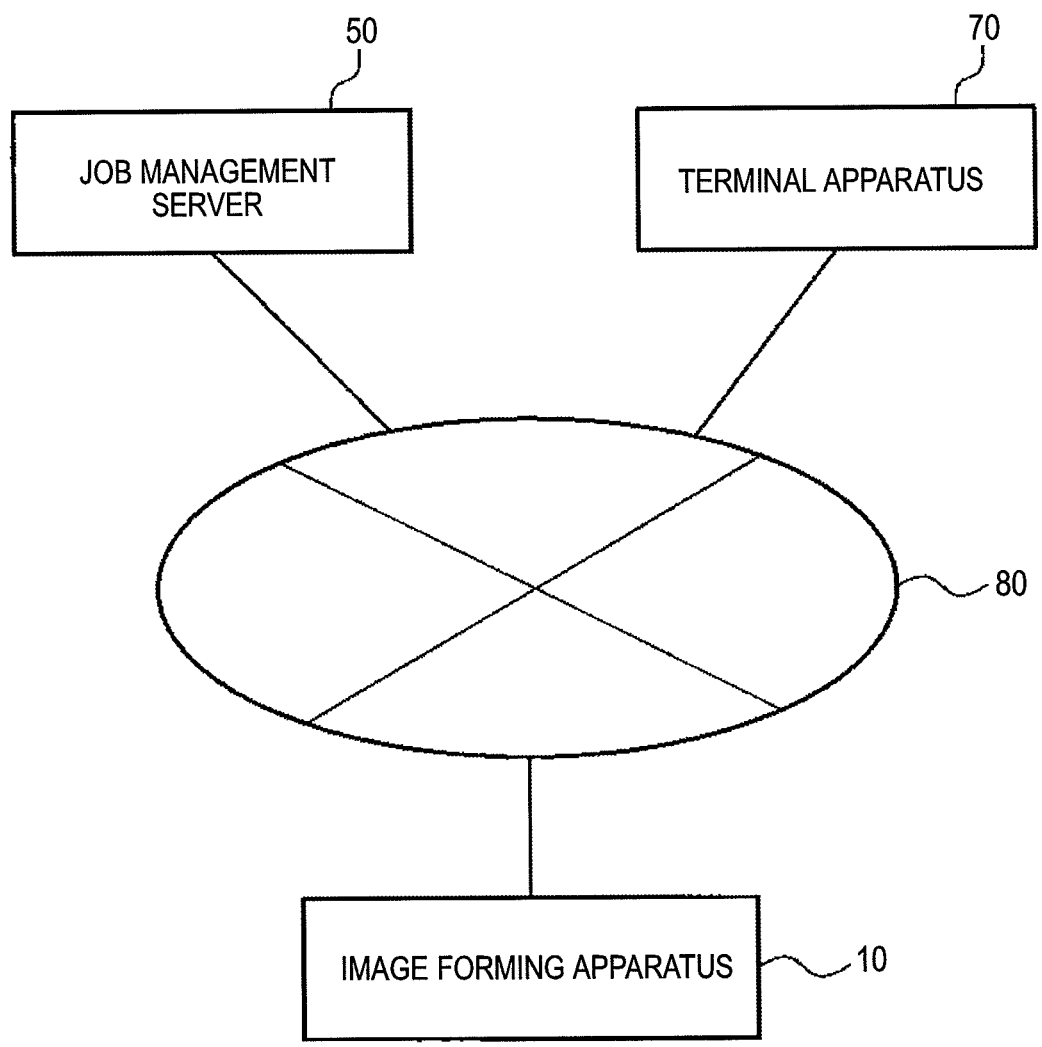
FIG. 3 is a diagram schematically showing a state where an image forming apparatus, a job management server, and a terminal apparatus are connected to each other through a computer network.

As described above, the image forming apparatus 10 of this exemplary embodiment is connected to the computer network 80. As shown in FIG. 3, in addition to the image forming apparatus 10, the job management server 50 which manages a job and the terminal apparatus 70 are connected to the computer network 80.

Figure 4:
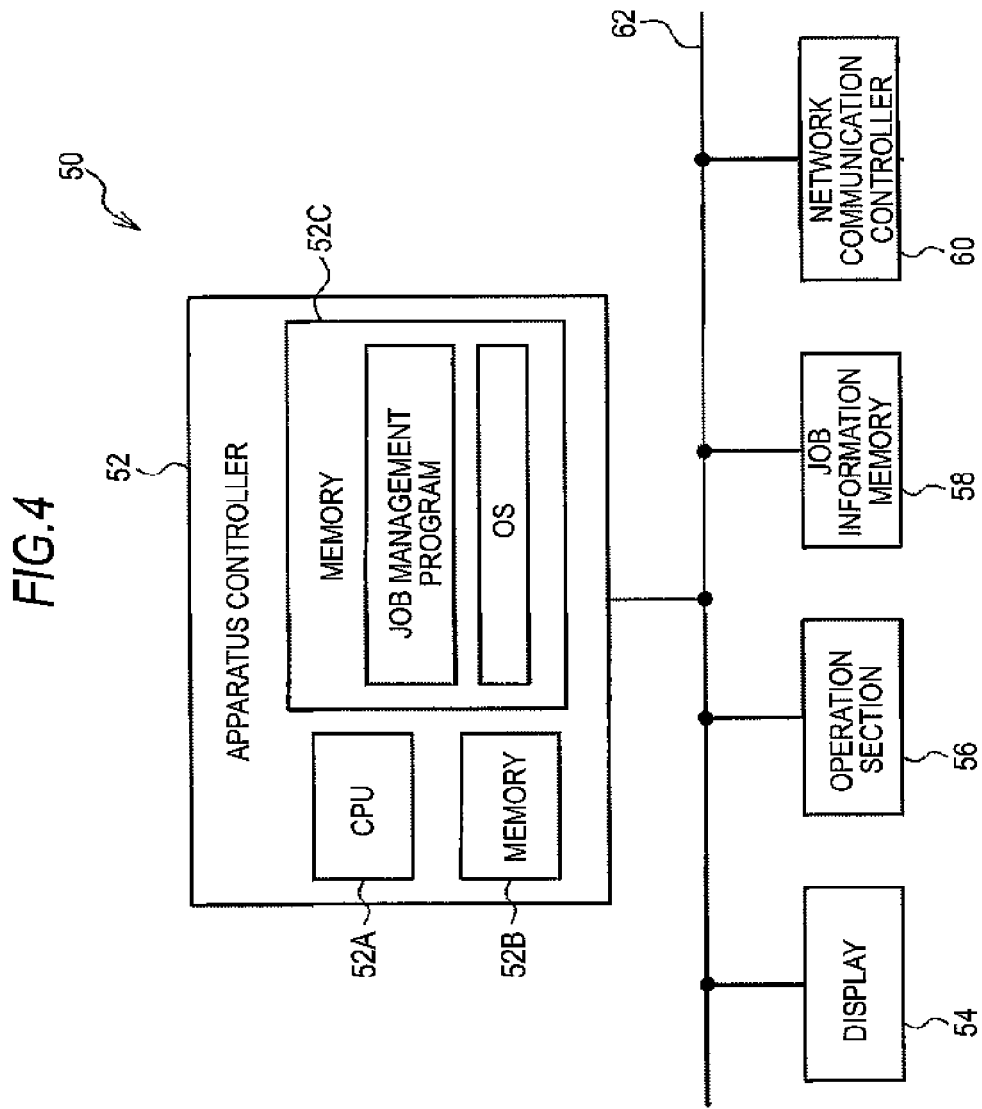
FIG. 4 is a schematic block diagram showing an example of the configuration of a job management server.

FIG. 4 shows the configuration of the job management server 50. The job management server 50 includes an apparatus controller 52 which controls the workings of the respective sections of the job management server 50, a display 54 which includes an LCD or the like, an operation section 56 which includes a keyboard, a mouse, or the like and operated by the user, a job information memory 58 which stores job information, and a network communication controller 60 which performs transmission/reception of information with respect to the image forming apparatus 10 or the terminal apparatus 70 through the network cable and the computer network 80. These sections are connected to each other through a bus 62.

The apparatus controller 52 is constituted by a microcomputer or the like, and includes a CPU 52A, a memory 52B, and a nonvolatile memory 52C which is constituted by an HDD (Hard Disk Drive), a flash memory, or the like. The memory 52C at least stores a job management program for managing an execution-instructed job in the image forming apparatus 10, and a program of an operating system (OS) which functions as a platform for executing various programs, such as the job management program.

The CPU 52A of the job management server 50 executes the job management program and stores job information received from the image forming apparatus 10 in the job information memory 58 to perform a process for managing a job.

The terminal apparatus 70 has the same configuration as the general PC. The terminal apparatus 70 creates an instruction to execute a job, such as the print process, for the image forming apparatus 10 and transmits the execution instruction to the image forming apparatus 10 through the computer network 80.

Next, the operation of this exemplary embodiment will be described.

First, a case will be described where the standard system executes a job of a standard function. Here, the job of the copy process as the job of the standard function will be explained.

Figure 5:
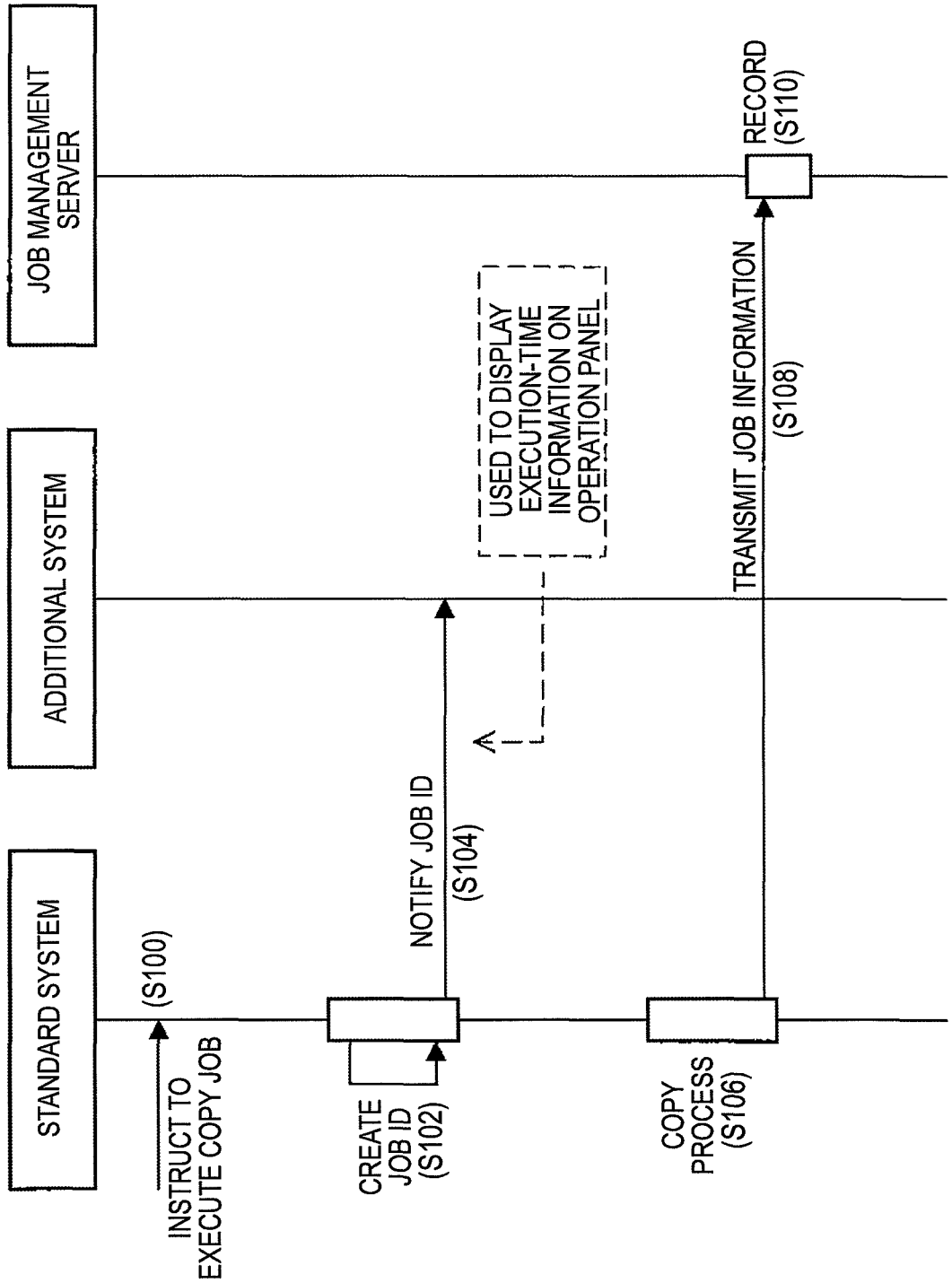
FIG. 5 is a diagram showing a sequence example when a job of a copy process is performed.

FIG. 5 is a diagram showing a sequence example when the job of the copy process is executed.

In this exemplary embodiment, while the image forming apparatus 10 is working, the operation of the user on the operation receiver 18B is monitored by the CPU 12A (apparatus controller 12) which executes the control program. When the user of the image forming apparatus 10 operates the operation receiver 18B of the operation panel 18 and instructs to execute the job of the copy process, the apparatus controller 12 determines that the execution-instructed job is the standard function to be provided by the standard application, and notifies the execution instruction of the job to the standard system (S100).

In the standard system, the program of the job ID creation process runs to create the job ID for the job which has been instructed to be executed in the standard system (S102). The job ID is stored in the job information memory area provided in correspondence with the standard system as a part of the job information. In the job ID creation process, the job ID is created for each execution-instructed job in accordance with the predefined rule. There is no case where the same job ID is created from a plurality of different jobs.

The created job ID is notified to the additional system (S104). As described above, while the copy process is executed by the standard system without passing through the additional system, the standard system notifies the processing end result or information representing the state during processing to the additional system so as to display thereof on the display 18A of the operation panel 18 under the screen control of the additional system. Thus, in practice, the job ID is notified before the job starts to be executed.

Next, after the job ID has been created, the standard system executes the job of the copy process (S106). While the job is being processed, the job ID and information representing the processing state are notified to the additional system, and the information representing the processing state is displayed on the display 18A of the operation panel 18 under the screen control of the additional system. When the job process ends, the job ID and the processing result are notified, and the processing result is displayed on the display 18A of the operation panel 18 under the screen control of the additional system. In FIG. 5, the notification of the processing end result of the job or the information representing the processing state has been omitted. Since the screen control performed by the additional system is a process which is accompanied by the job of the copy process in the standard system, the screen control is not recognized as a job. The information representing the processing result, such as the normal end of the job of the copy process, is stored in the job information memory area as a part of the job information.

When the job of the copy process ends, the standard system executes the function of the job information transmission process to read the job information including the job ID from the job information memory area provided in correspondence with the standard system and to transmit the read job information to the job management server 50 (S108).

When the job information is received, the job management server 50 stores the received job information in the job information memory 58 (S110).

Next, a case will be described where the additional system executes a job of an additional function. Here, description will be provided as to the job of the print process as the job of the additional function.

Figure 6:
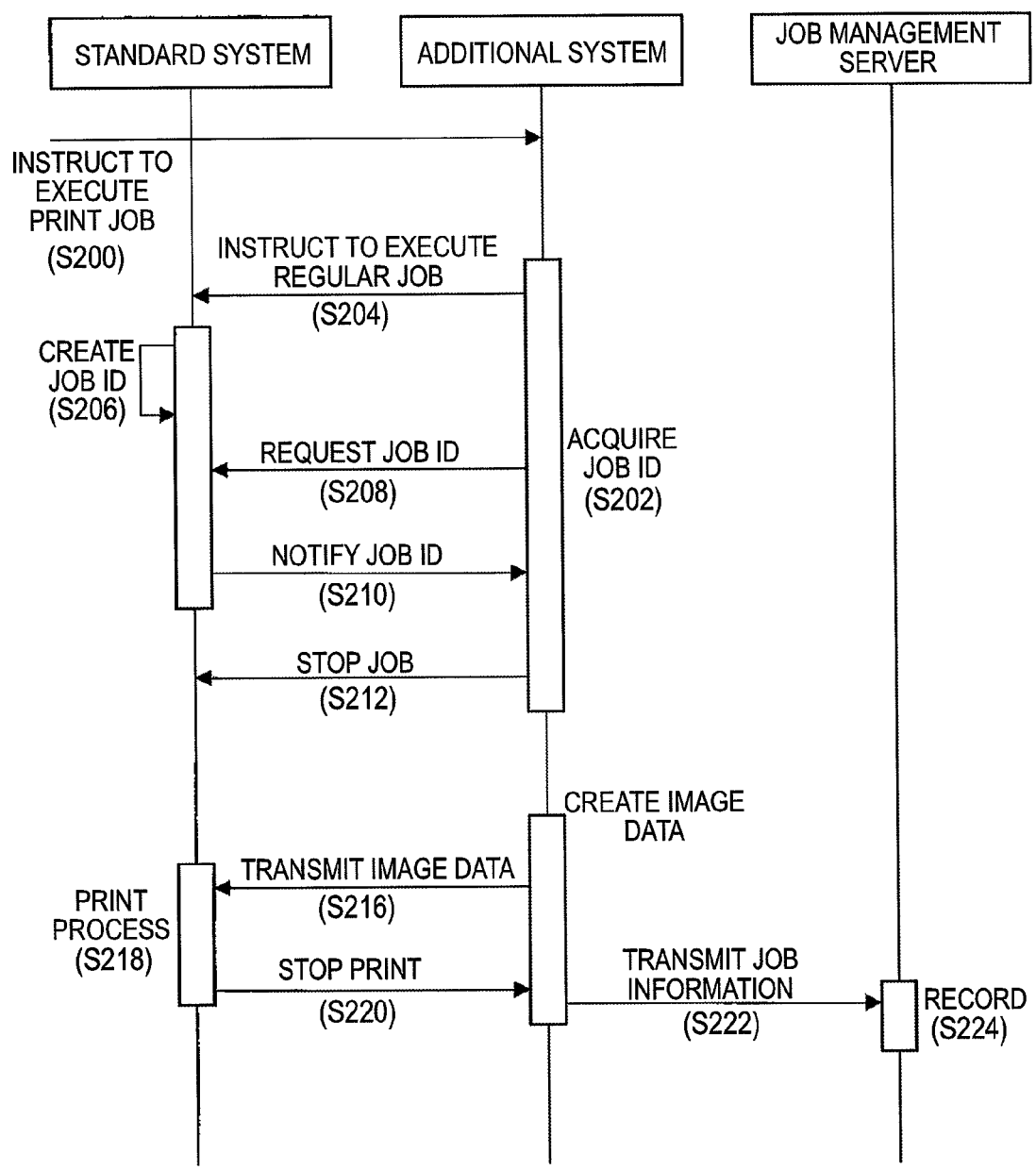
FIG. 6 is a diagram showing a sequence example when a job of a print process is performed.

FIG. 6 is a diagram showing a sequence example when the job of the print process is executed.

When an instruction to execute the job of the print process is received, the CPU 12A (apparatus controller 12) which executes the control program and it is determined that the execution-instructed job is the additional function to be provided by the additional application. Then, the execution instruction of the relevant job is received by the additional system (S200).

Figure 7:
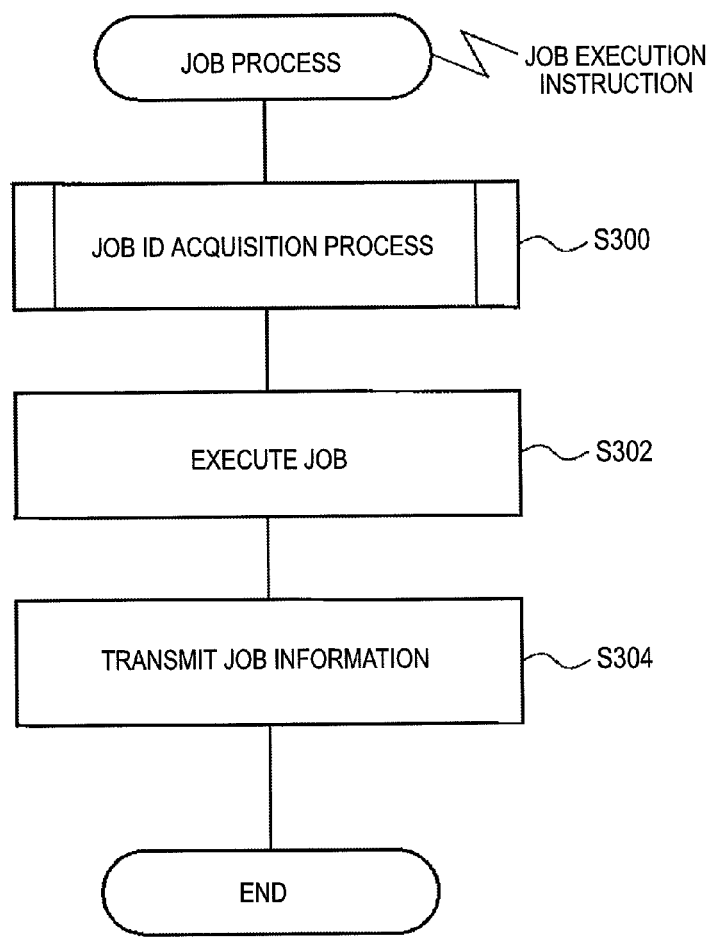
FIG. 7 is a flowchart showing the flow of job process to be performed by an additional system.
Figure 8:
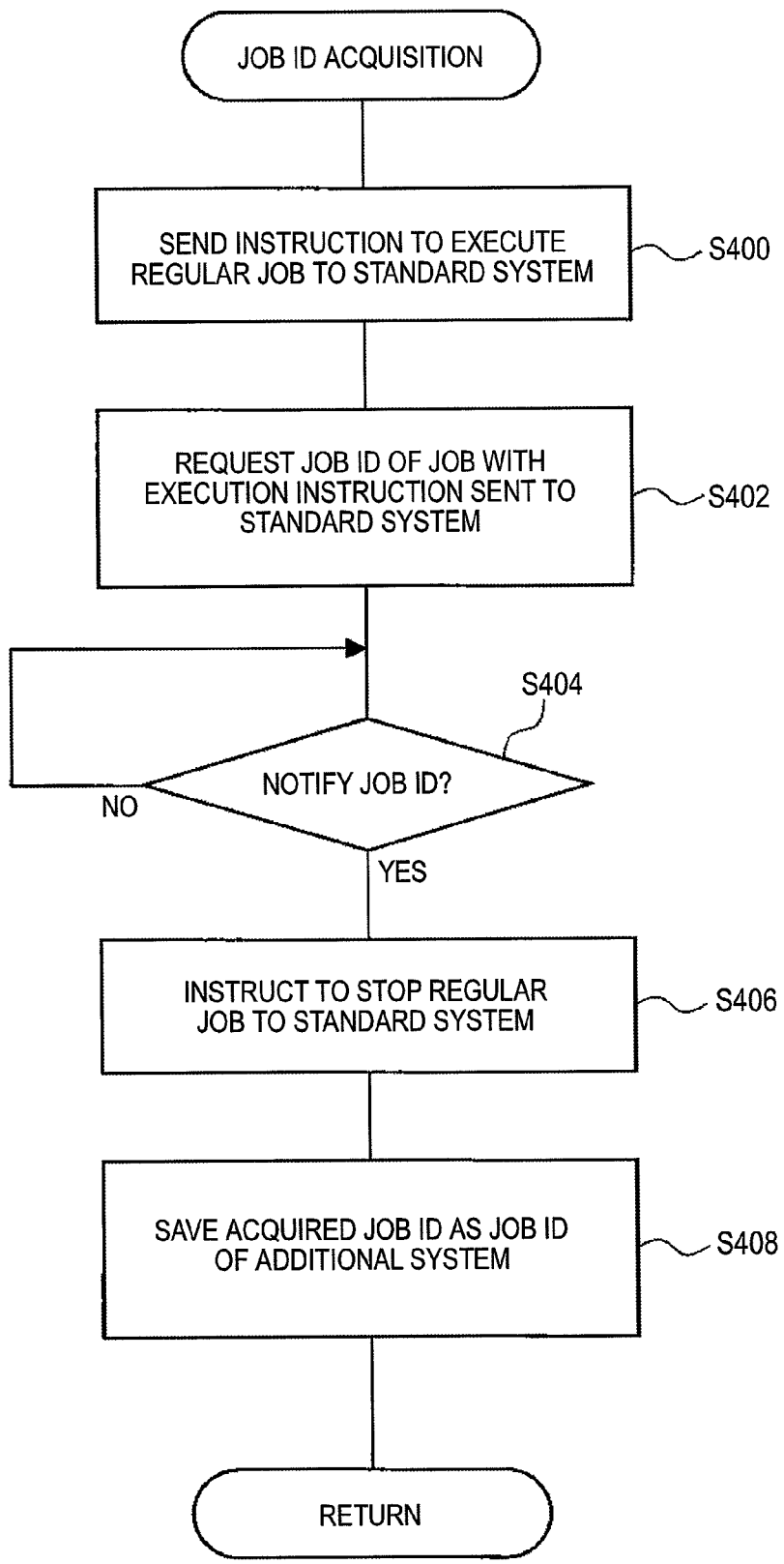
FIG. 8 is a flowchart showing the flow of the process routine of a job ID acquisition process.

In the additional system, a job process shown in FIG. 7 starts. In Step 300, a job ID acquisition program included in the control program runs, and a process starts for acquiring the job ID for the execution-instructed job (also see S202 in FIG. 6). FIG. 8 is a flowchart showing the flow of a processing routine of the job ID acquisition process.

In Step 400, an instruction to execute a job of a predefined function (hereinafter, referred to as a regular job) as one of the standard functions is sent to the standard system (also see S204 in FIG. 6).

In the standard system, when the execution instruction of the regular job is received, the program of the job ID creation function runs to create the job ID for the execution-instructed regular job (also see S206 in FIG. 6).

Meanwhile, in Step 402, the additional system requests the standard system for the job ID of the execution-instructed regular job (also see S208 in FIG. 6). The standard system notifies the created job ID in response to the request (also see S210 in FIG. 6).

In Step 404, the additional system continues to wait until the job ID is notified from the standard system. When the job ID is notified, the process progresses to Step 406, and an instruction to stop the regular job is sent to the standard system (also see S212 in FIG. 6). When the stop instruction of the regular job is received, the standard system stops the execution of the regular job.

In Step 408, the additional system stores the acquired job ID as the job ID of the job of the execution-instructed print process in the job information memory area provided in the memory 12B or the like in correspondence with the additional system as a part of the job information.

In Step 302 of FIG. 7, the additional system which has acquired the job ID executes the job of the print process. Specifically, as shown in FIG. 6, image data usable for image formation in the image forming section 16 is created from print information (page description language: PDL) included in the execution instruction of the job of the print process in a format of a bitmap image or in a format of being easily converted to a bitmap image (S214). The additional system transmits the created image data to the standard system (S216).

When image data is received, the standard system runs the program for input/output control and causes the image forming section 16 to perform the print process based on received image data (S218). If the print process ends, the standard system transmits a print end notification to the additional system (S220). Since the input/output control which is performed by the standard system is accompanied by the job of the print process in the additional system, the input/output control is not recognized as a job.

While the job is being processed, the information representing the processing state is displayed on the display 18A of the operation panel 18 under the screen control of the additional system. After image data has been transmitted to the standard system, until the print process based on image data ends, the information representing the processing state is notified from the standard system. The additional system receives the notification and executes the function of the additional system to display the information representing the processing state on the display 18A of the operation panel 18. Further, when the print end notification (information representing the processing result) is received, information representing print end is displayed. The information representing the processing result is stored in the job information memory area as a part of the job information.

When the job of the print process ends, the additional system executes the job information transmission function to transmit the job information including the job ID to the job management server 50 (S222).

When the job information is received, the job management server 50 stores the received job information in the job information memory 58 (S224).

As descried above, the job ID is created by the function of the job ID creation process provided in the standard system, but is not created in the additional system. Thus, the job ID created for the job instructed to be executed in the standard system and the job ID created for the job instructed to be executed in the additional system do not overlap each other. Therefore, since each job instructed to be executed by the image forming apparatus 10 is uniquely identified, it is not necessary that, with regard to job management, the job management server 50 manages the jobs with differentiating between the standard system and the additional system.

Such as a job for notifying setting information, a regular job which does not affect another job which uses the hardware resource may be used.

In the image forming apparatus 10 in which the standard functions and the additional functions are given priority in advance in accordance with execution order, and when execution instructions of a plurality of jobs are received, a job of a function with high priority is executed, a job of a function with low priority (for example, the lowest priority) may be used as the regular job. A job of a function which starts to be executed in response to the input of predefined information may be used as the regular job. If the input is not made until the stop is instructed, the job does not start. This is better from the viewpoint of safety.

With regard to the job information of the regular job which is stopped, the additional system may delete the job information of the regular job from the job information memory area provided in correspondence with the standard system before transmission of the job information such that the job information is not transmitted from the standard system to the job management server 50. A special job instructed to be executed only for job ID acquisition may be prepared, a function which can differentiate between the special job and another job may be provided in the standard system. For a job which is determined by the function to be a special job, the job information may not be transmitted to the job management server 50. The addition of such a function does not affect development efficiency very much. The job management program may be configured such that, when the job management server 50 receives a plurality of job information having the same ID, job information with the processing result representing the stoppage is not stored in the job information memory 58. The job management program may be configured such that, when the job management server 50 receives a plurality of job information having the same job ID, job information having a later job start time or end time may be selected and stored in the job information memory 58. According to the specification of the image forming apparatus 10, when there is a job defined so as to leave no job information, the job may be used as the regular job.

In the above-described exemplary embodiment, the job management server 50 is provided outside the image forming apparatus 10, and the job information is transmitted to and stored in the job management server 50. However, the invention is not limited thereto. For example, the job information may be stored in a predefined memory area of a readable and writable nonvolatile memory (HDD, flash ROM, or the like) provided inside the image forming apparatus 10. The memory areas for storing the job information corresponding to the standard system and the additional system may be provided in the above-described memory of the image forming apparatus 10, and the job information of the job which is instructed to be executed in each system may be stored in the memory area corresponding to each system.

Figure 9:
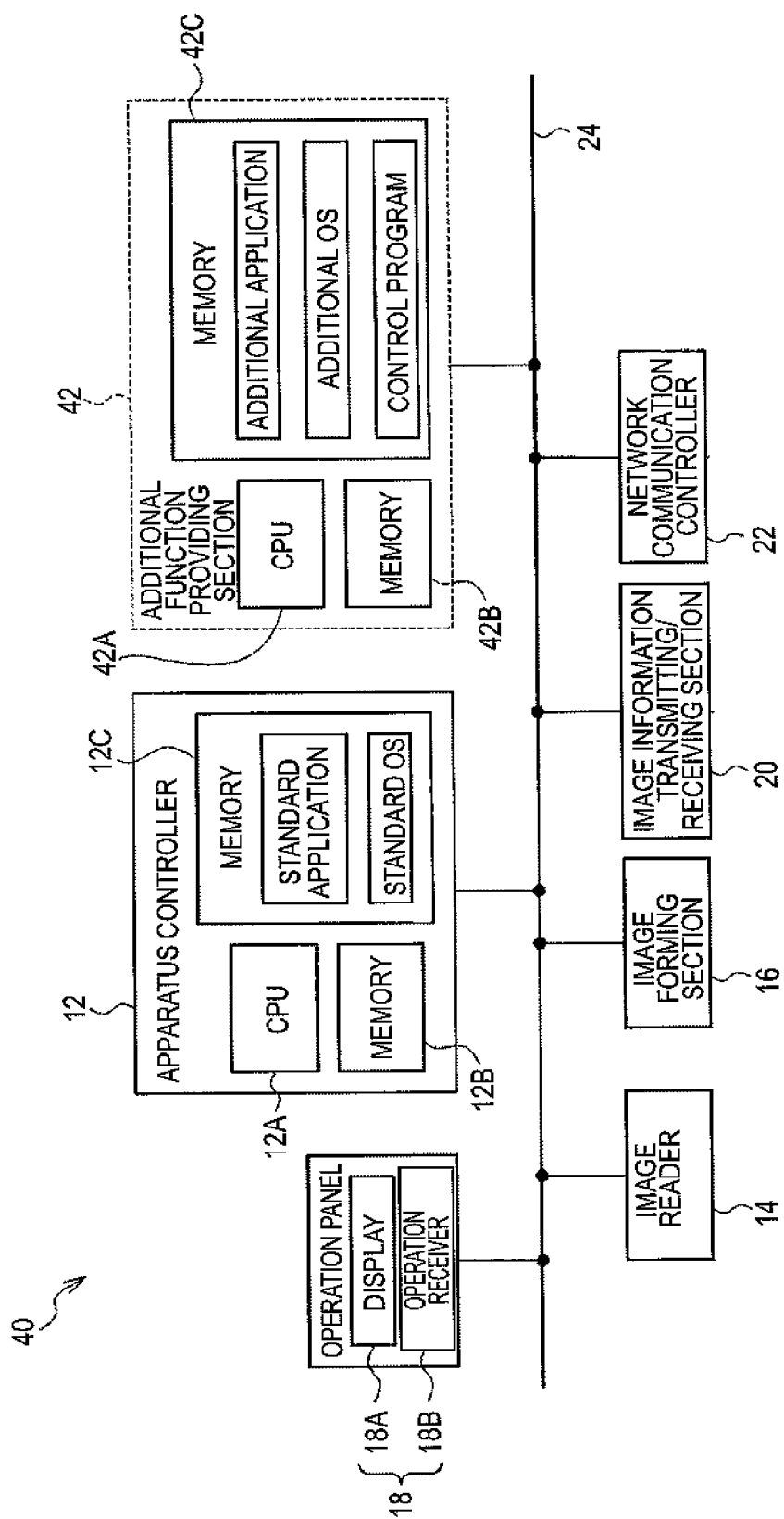
FIG. 9 is a schematic block diagram showing another example of the configuration of the image forming apparatus.

In the above description, the program of the standard application as an example of a first application program, the program of the additional application as an example of a second application program, and the control program are executed by the CPU 12A of the apparatus controller 12. However, the invention is not limited to this exemplary embodiment. For example, the invention may be applied to a configuration in which an additional function providing section 42 is inserted into an expansion slot provided in the image forming apparatus 40, adding functions to be provided to the user. As shown in FIG. 9, the additional function providing section 42 constituted by a microcomputer or the like, and is provided with, on a substrate, a CPU 42A, a memory 42B, and a nonvolatile memory 42C storing a program of an additional OS, a program of an additional application, and a control program.

In this configuration, the additional function providing section 42 is an example of an additional computer, and the program of the additional OS, the program of the additional application, and the control program are executed by the CPU 42A of the additional function providing section 42. In the configuration of FIG. 9, for example, the control program may be stored in the memory 12C of the apparatus controller 12 and executed by the CPU 12A.

In the above description, a case has been described where a single additional system is provided, two or more additional OSs other than the standard OS may be mounted in the image forming apparatus 10. However, two or more additional systems may be provided. In such a configuration, the function of the job ID acquisition process is provided in each additional system. Similarly, in the configuration of FIG. 9, two or more additional function providing sections 42 may be mounted.

In the above description, an example has been described where the image forming apparatus 10 is connected to the job management server 50 or the terminal apparatus 70 through the computer network 80. However, for example, the image forming apparatus 10 may be connected directly to the job management server 50 or the terminal apparatus 70 by a cable without passing through the computer network 80. A communication section for connecting to an external apparatus is not limited to the network.

In the above description, an exemplary embodiment has been described where a program which is an example of the control program of the image forming apparatus according to the invention is additionally stored in the memory 12C of the apparatus controller 12. However, the control program of the image forming apparatus according to the invention may be provided through a recording medium storing the program, such as a CD-ROM or a DVD-ROM.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image forming apparatus comprising:
    a first processing section that, in a first environment where a first operating system is running, executes a first process for a first application program, and generates a first identification information for identifying the first process; and
    a second processing section that, in a second environment where a second operating system is running, executes a second process for a second application program, and when the second process is instructed to be executed, requires the first processing section to generate a second identification information, and acquires the second identification information generated by the first processing section as identification information for identifying the second process,
    wherein upon requiring the first processing section to generate the second identification information, the second processing section sends an instruction to execute a third process to the first application program, and
    wherein after acquiring the second identification information generated in accordance with the instruction to execute the third process, the second processing section outputs an instruction to stop the third process for the first application program to the first processing section.

2. The image forming apparatus according to claim 1, wherein
    the first processing section further performs a first control process for controlling such that process information of the first process for the first application program and the generated first identification information of the first process for the first application program are stored in an external or internal memory of the image forming apparatus, and
    the second processing section further performs a second control process for controlling such that process information of the second process for the second application program and the acquired second identification information of the second process for the second application program are stored in the external or internal memory.

3. A method of acquiring identification information, comprising:
    in a first environment where a first operating system is running, executing a first process for a first application program, and generates a first identification information for identifying the first process; and
    in a second environment where a second operating system is running, executing a second process for a second application program, and when the second process is instructed to be executed, requires a first processing section to generate a second identification information, and acquires the second identification information generated as identification information for identifying the second process, wherein upon requiring the first processing section to generate the second identification information, sending, by a second processing section, an instruction to execute a third process to the first application program, and wherein after acquiring the second identification information generated in accordance with the instruction to execute the third process, outputting, by the second processing section, an instruction to stop the third process for the first application program to the first processing section.

4. A non-transitory computer readable medium storing a program causing a computer to execute a process for acquiring identification information, the process comprising:

in a first environment where a first operating system is running, executing a first process for a first application program, and generates a first identification information for identifying the first process; and in a second environment where a second operating system is running, executing a second process for a second application program, and when the second process is instructed to be executed, requires a first processing section to generate a second identification information, and acquires the second identification information generated as identification information for identifying the second process, wherein upon requiring the first processing section to generate the second identification information, sending, by a second processing section, an instruction to execute a third process to the first application program, and wherein after acquiring the second identification information generated in accordance with the instruction to execute the third process, outputting, by the second processing section, an instruction to stop the third process for the first application program to the first processing section.

5. A non-transitory computer readable medium storing a program causing a computer to execute a process for acquiring identification information, the process comprising:

in a second environment where a second operating system is running, executing a second process for a second application program, wherein the computer is connected to another computer that is caused to execute a function comprising, in a first environment where a first operating system is running, executing a first process for a first application program, and generating a first identification information for identifying the first process, and the process further comprising, when the second process is instructed to be executed, requiring a first processing section to generate a second identification information, generated as identification information for identifying the second process, wherein upon requiring the first processing section to generate the second identification information, sending, by a second processing section, an instruction to execute a third process to the first application program, and wherein after acquiring the second identification information generated in accordance with the instruction to execute the third process, outputting, by the second processing section, an instruction to stop the third process for the first application program to the first processing section.

6. The image forming apparatus according to claim 1, wherein
generating the first and the second identification information is performed only by the first processing section.

7. The image forming apparatus according to claim 1, wherein the second application program displays the second process for the second application program on a display, and executes the second process for the second application program in response to the second process for the second application program being selected.

8. The image forming apparatus according to claim 1, wherein the second application program displays the second process for the second application program and the first process for the first application program on a display, and executes a selected process for a corresponding application program in response to one of the first process for the first application program and the second process for the second application program being selected.

9. The image forming apparatus according to claim 1, wherein the third process has an execution priority which is lower than the first process and the second process.

10. The image forming apparatus according to claim 1, wherein the third process is for notifying a job setting information.

11. The image forming apparatus according to claim 1, wherein the third process notifies a job setting information to a user of the image forming apparatus.

12. The image forming apparatus according to claim 1, wherein the third process has a lower hardware utilization than the first process and the second process.

* * * * *